May 16, 1961  S. HACKNEY ET AL  2,984,612
NUCLEAR REACTOR REFUELLING DEVICES
Filed July 1, 1958  9 Sheets-Sheet 3

INVENTORS
STANLEY HACKNEY
GORDON PACKMAN

ATTORNEYS

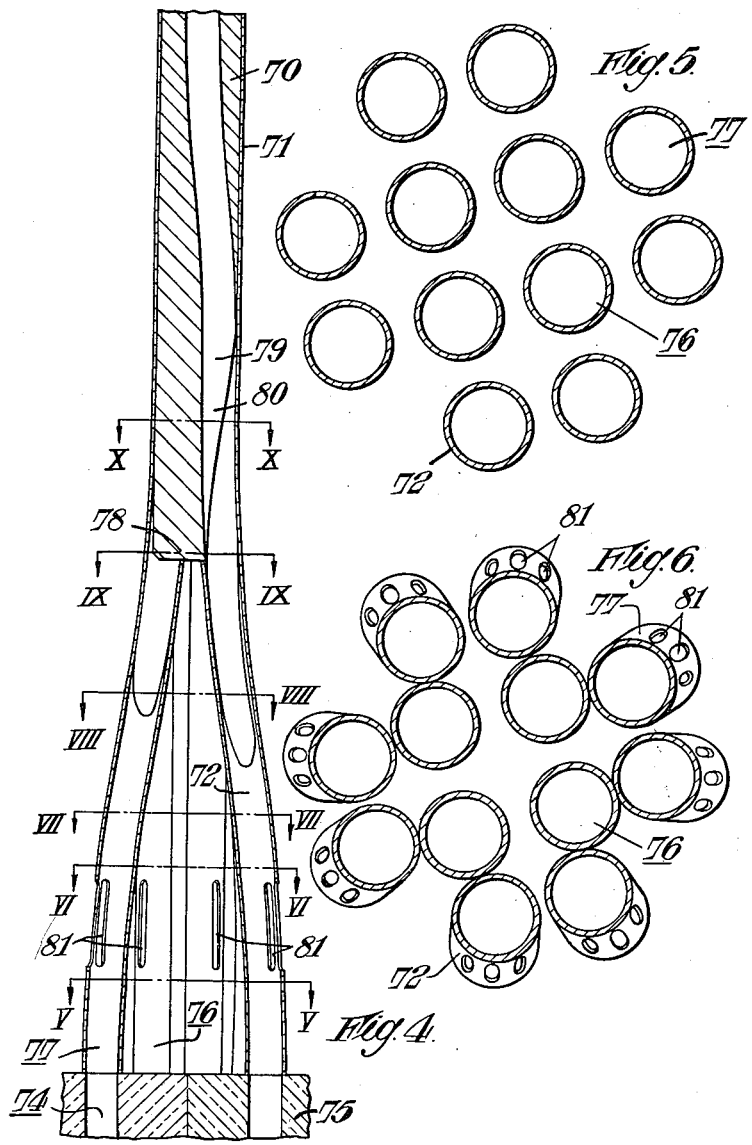

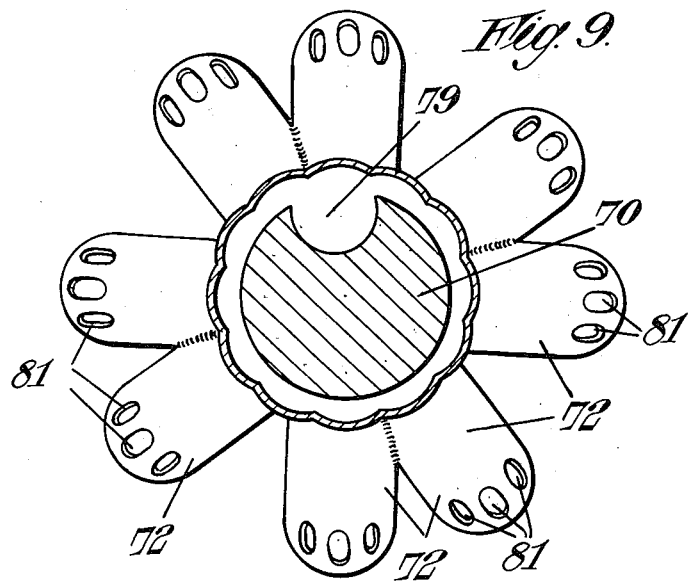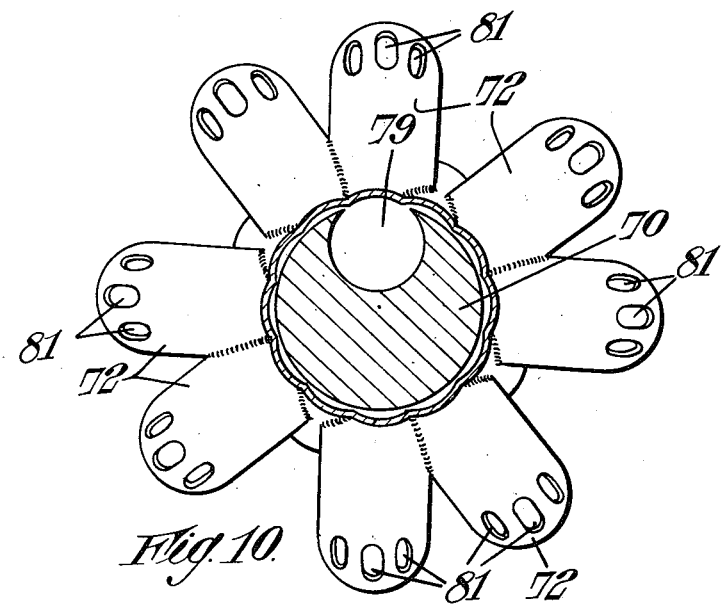

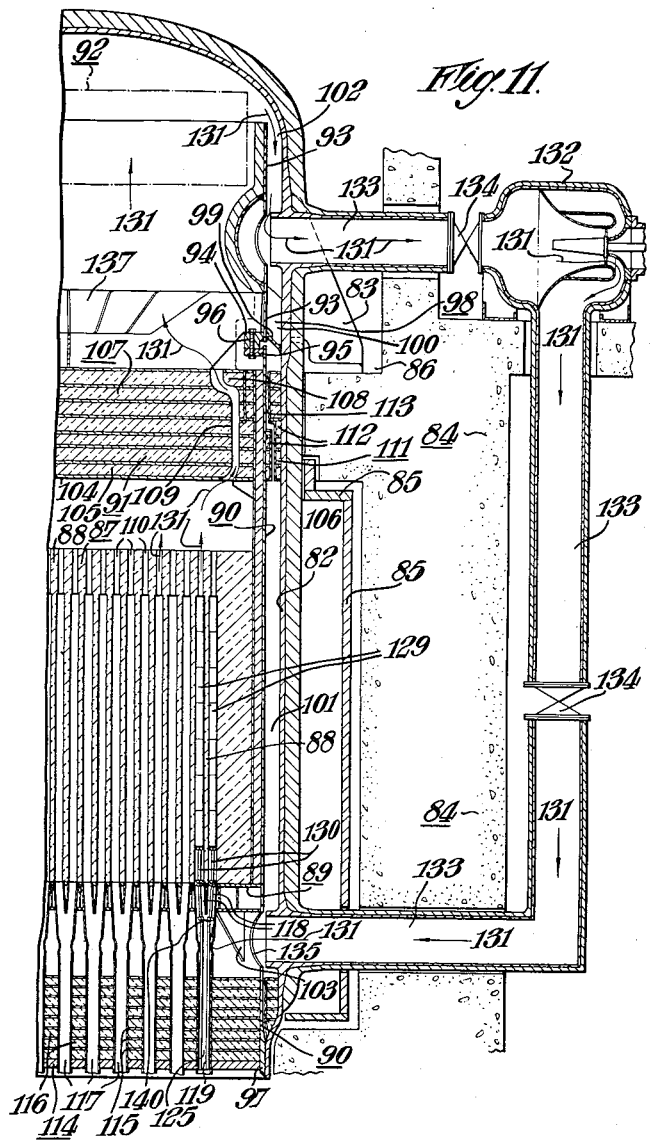

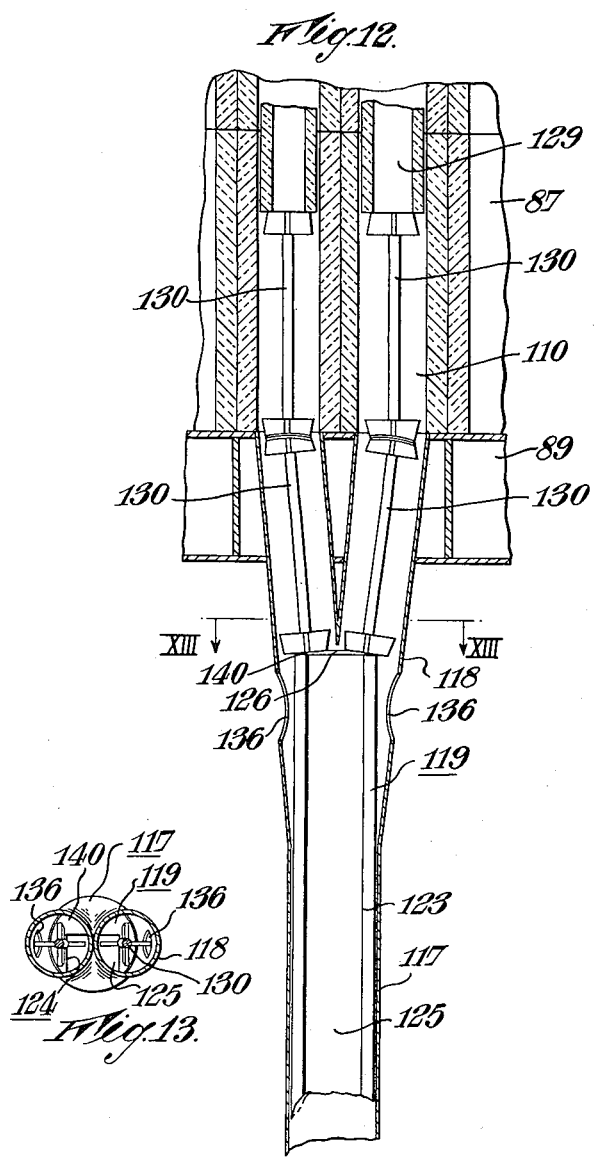

United States Patent Office 2,984,612
Patented May 16, 1961

2,984,612

NUCLEAR REACTOR REFUELLING DEVICES

Stanley Hackney, Fearnhead, Warrington, and Gordon Packman, Risley, Warrington, England, assignors to United Kingdom Atomic Energy Authority, London, England Filed July 1, 1958, Ser. No. 745,920

Claims priority, application Great Britain July 1, 1957

5 Claims. (Cl. 204—193.2)

This invention relates to nuclear reactors and it is concerned primarily with means for refuelling nuclear reactors.

The problem of refuelling nuclear reactors contained within a pressure vessel is that of providing access to a large number of channels in the reactor with only a minimum number of holes in the pressure vessel. Accordingly it is the present custom in reactor design to provide access holes through the pressure vessel and have a device which can give access to a group of fuel element channels from a single access hole.

The present invention provides a new form of device giving access to a group of fuel element channels in the core of a nuclear reactor and comprises a rod rotatable about its axis having a passageway therethrough and enclosed within a structural tube which forks into a group of pipes each adapted to service a fuel element channel in the core of the reactor so that by rotation of the rod said passageway can be positioned in connection with anyone of the group of pipes allowing charging or discharging of fuel elements into or from the related fuel element channel through the passageway and the corresponding pipe of the group of pipes.

In a further form of the invention it is arranged for said device to function also to provide restraint to a moderator structure in a reactor in a direction parallel to the fuel element channels.

In another form of the device for refuelling a nuclear reactor having a core structure with vertical fuel element channel passing therethrough and refuelled from below the core, fuel elements are supported in the vertical fuel element channels by members located in the group of pipes said members being supported on the rod but removable along the passageway in the rod.

The invention will now be described with reference to the accompanying drawings in which:

Fig. 4 is a longitudinal sectional elevation of a further form of the invention.

Figs. 5, 6, 7, 8, 9 and 10 respectively are cross-sectional elevations along the lines V—V; VI—VI; VII—VII; VIII—VIII; IX—IX and X—X in Fig. 4.

Fig. 11 is a longitudinal sectional elevation of a third form of the invention.

Fig. 12 is a detail of Fig. 11 on a larger scale.

Fig. 13 is a section along the line XIII—XIII in Fig. 12.

Figure 14:
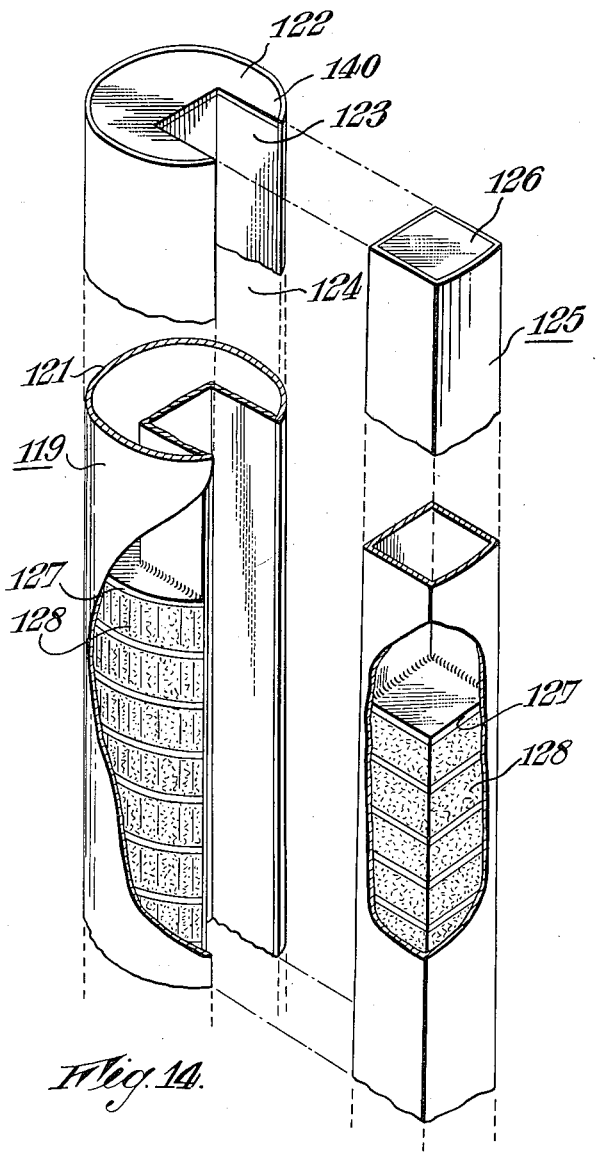

Fig. 14 is a detail of Fig. 11 in isometric form.

Figure 1:
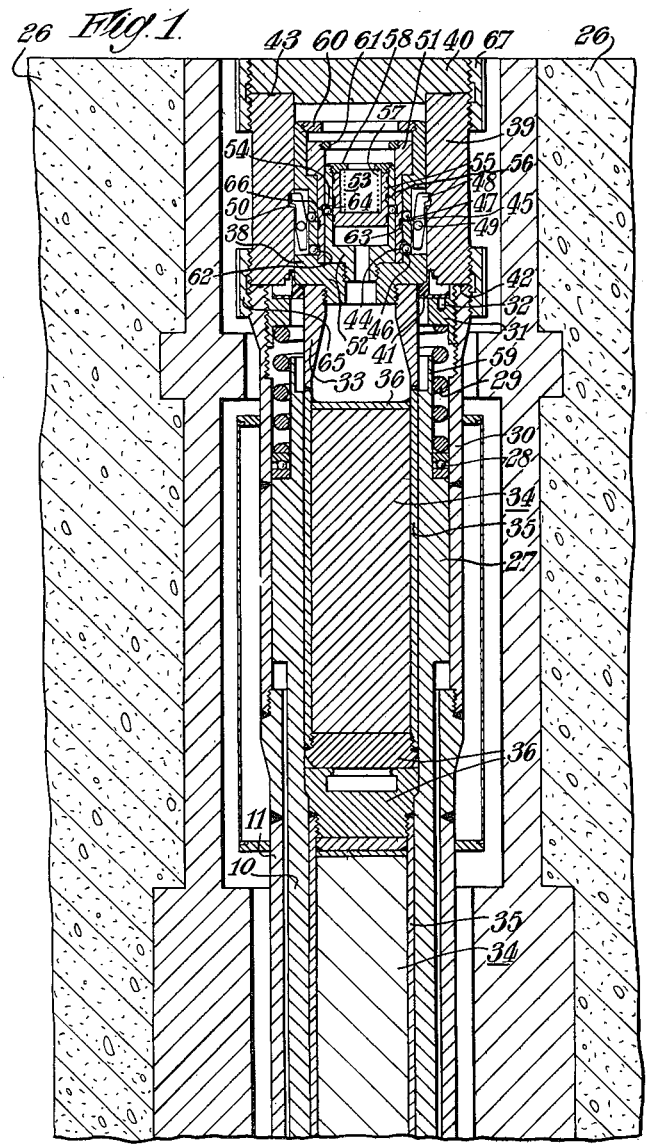
Figs. 1 and 2 are sectional elevations of the upper and lower halves of a device in accordance with the invention.
Figure 2:
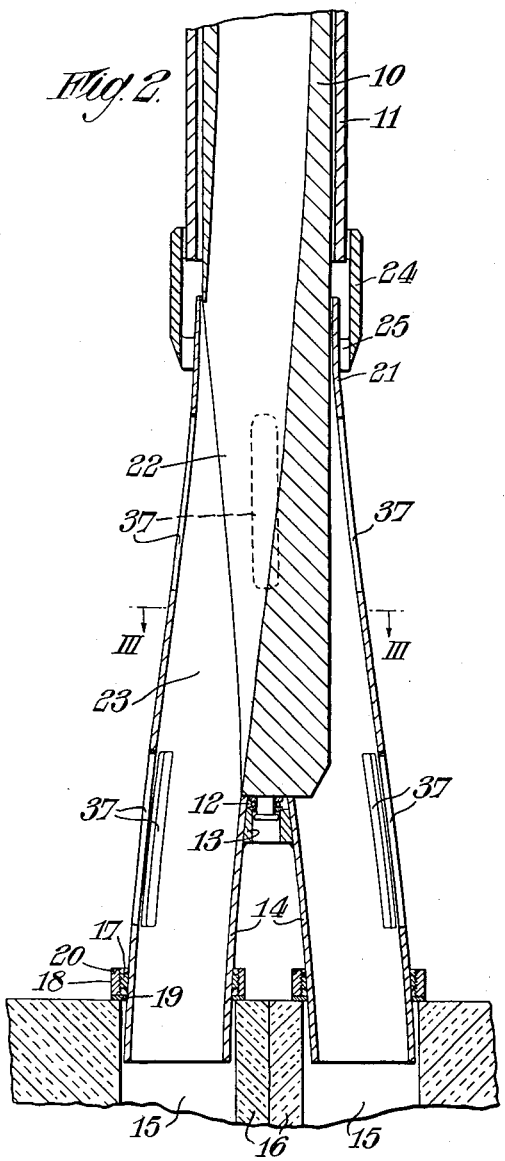
Figure 3:
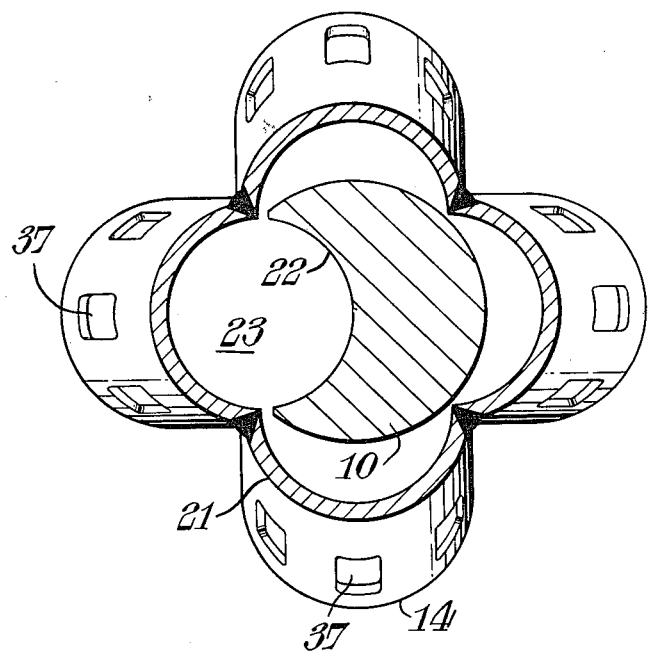
Fig. 3 is a sectional view on the line III—III of Fig. 2.
Figure 7:
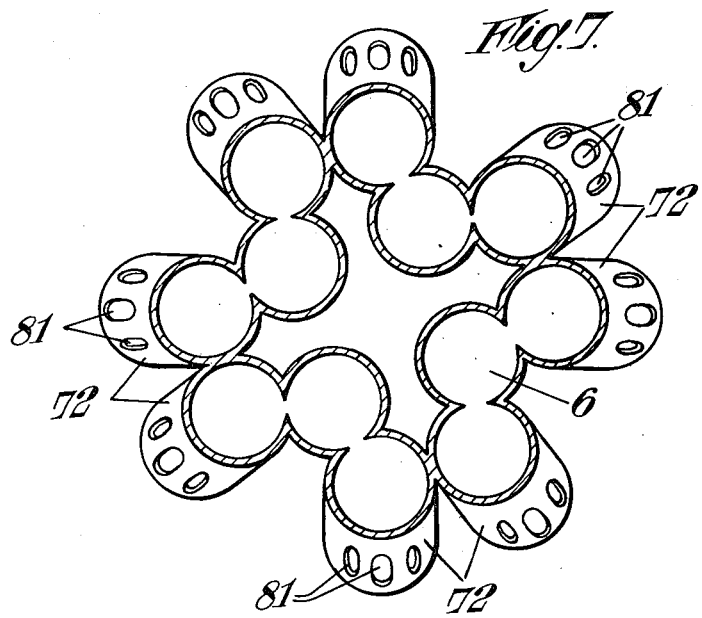
Figure 8:
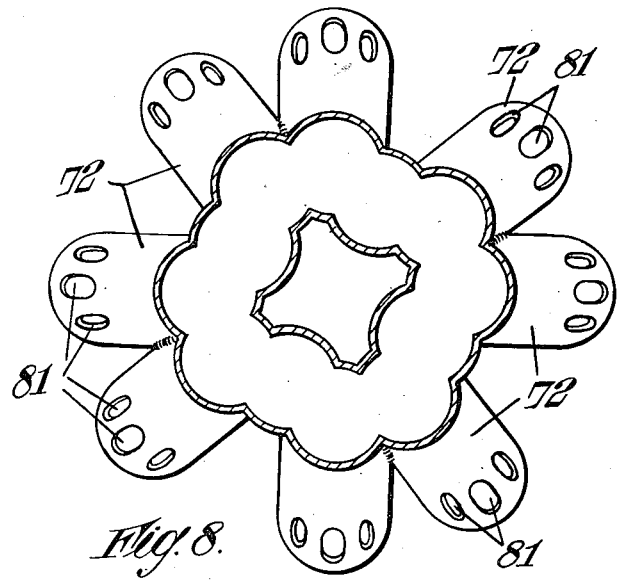

In Figs. 1, 2 and 3 a rod 10 in a tube 11 is rotatably mounted on a thrust bearing 12 which seats on a block 13 welded to a group of four pipes 14 coupling with fuel element channels 15 in a moderator structure 16 of a nuclear reactor. The pipes 14 have flanges 17 screw threaded to accept clamping rings 18 which bear on the moderator structure 16 through annular thrust plates 19. Holes 20 are provided for suitable keys for turning the rings 18.

The thrust rod 10 is provided with a passageway 22 which breaks through the wall of the rod 10 at a cut away part 23. The pipes 14 meet in a single pipe 21 and coolant ports 37 are provided in both the pipes 14 and pipe 21. The pipe 21 ends in a guide bracket 24 to which it is connected by webs 25. The bracket 24 acts as a guide for the tube 11 surrounding the rod 10.

Referring to Fig. 1, the rod 10 and the tube 11 pass through the reactor pressure shell and then through a radiation shield 26. The tube 11 is welded to the pressure shell and the rod 10 contains shield plugs 34 in steel sheaths 35 with end caps 36, two separate plugs being provided to save headroom when removed in readiness for charging and discharging fuel elements. Near its upper end the thrust rod 10 has a flange 27 which carries a thrust bearing 28. A spring 29, in a spring housing 30 which forms a continuation of the tube 11, acts between the bearing 28 and an adjustable collar 31, screwed into the housing 30. The flange 27 terminates in splines 59. A hole 32 is provided for a suitable key for turning the collar 31. The sheath 35 of the upper shield plug 34 extends into a shaped sleeve 33 and the sleeve 33 has a cup-shaped member 38 screwed into it. The plugs 34 and member 38 are restrained from being ejected from the rod 10 by gas pressure in the reactor by latches 48 pivotted on pins 49, the latches 48 engaging with recesses 50 in a sleeve 39 coupled with the spring housing 30 by a screwed collar 65 and sealed by rings 42. The latches 48 are retained in position by balls 47 carried in slots 45 in the member 38, the balls 47 themselves being forced outwards against the latches 48 by a sleeve 51. The sleeve 51 is secured in the member 38 by a ring 60 and carries a lifting ring 61. Within the sleeve 51 there is a second cup-shaped member 52 screwed into the member 38. The top end of member 52 is screwed to receive a retaining ring 58 and has inside a piston 55 loaded from the ring 58 by a spring 53. In the wall of member 52 there are slots 64 containing balls 54 which are greater in diameter than the thickness of the wall. The extra space for the balls 54 is provided alternatively by circumferential grooves 56 in the piston 55 and grooves 66 in sleeve 51. Balls 46 are carried in slots 44 and they rest in a groove 62 in the sleeve 51. The balls 46 are provided to operate the latches 48 to release them from the sleeve 39 when the sleeve 51 is removed. The sleeve 39 is closed by a cover 40 and screwed collar 67 and sealed by a ring 43. A rubber seal 41 is provided between the sleeve 39 and cup shaped member 38.

To charge and discharge fuel elements from the reactor the cover plate 40 is removed and the pressure of the gas in the tube 11 is taken at the seal 41. A connection is made to a charging machine by an adaptor sealing with the sleeve 39. The charging machine is then pressurised so that the piston 55 is forced down the member 52. The balls 54 fall into the slot 56 and the sleeve 51 is then free to be lifted by engagement at the lifting ring 61. As the sleeve 51 is raised the balls 47 fall into a groove 63 in the sleeve 51, and the balls 46 press on the bottom of the latches 48 thus releasing the latches from the recesses 50. The cup-shaped member 38 and shield plugs 34 may now be withdrawn and refuelling commenced. When one channel has been refuelled the rod 10 is rotated by engagement of a tool in the charge machine and the splines 59 so that the second channel can be refuelled and so on until all four channels have been refuelled. A thrust is continuously exerted on the graphite moderator structure 16 through the spring 29, rod 10, bearing 12, block 13, pipes 14 and flanges 17. The thrust of individual pipes may be adjusted through the clamping rings 18 and the total thrust through the collar 31.

A further form of the invention is shown in Figs. 4–10.

In the drawings there is shown a rod 70 rotatably mounted in a tube 71 which branches into a group of twelve pipes 72 coupling with fuel element channels 74 in a core structure 75 of a nuclear reactor. As shown in Fig. 5 the pipes 72 are arranged on two circles in a group 76 of four pipes 72 and an outer group 77 of eight pipes 72. The pipes 72 of the group 77 converge together and intersect on a common pitch circle with the pipes 72 of the group 76 at the base 78 of the rod 70 (see Fig. 9). The rod 70 has a passageway 79 which breaks through the wall of the rod 10 at a cut-away part 80 for the charge/discharge of fuel elements through any one of the twelve pipes 72 depending on the relative angular position of the rod 70 and the pipes 72. The pipes 72 have longitudinal slots 81 allowing the movement of coolant gas from the space surrounding the pipes 72 into the coolant channels 74.

A third form of the invention is shown in Figs. 11–14.

In Fig. 11 there is shown a graphite moderated gas cooled nuclear reactor comprising a pressure vessel 82 supported by angle brackets 83 within a concrete biological radiation shield 84 lined with a thermal neutron shield 85 of mild steel.

The brackets 83 are welded to the pressure vessel 82 and rest on a horizontal ledge 86 in the radiation shield 84. The pressure vessel 82 contains a graphite moderator structure 87 comprising an assembly of graphite blocks 88 stacked on a bottom support grid 89 within a cylindrical mild steel casing 90. The casing 90 also contains a composite radiation shield 91 intermediately located between the moderator structure 87 and a heat exchanger assembly 92 (shown in chain dotted outline). The heat exchanger assembly 92 is contained with a cylindrical extension 93 of the casing 90 having an internally welded end flange 94 at which connection is made with the casing 90 through an internal end flange 95 therein by means of bolts 96. The casing 90 is seam welded at its lower end 97 to the pressure vessel 82 and the extension 93 of the casing 90 is concentrically located within the pressure vessel 82 by a compositely welded fabrication 98 comprising a ring member 99 stiffened by webs 100. The casing 90 and the extension 93 thereof are of smaller external diameter than the internal diameter of the pressure vessel 82 to provide below the ring member 99 a thermally insulating annular gas space 101 between the casing 90 and the pressure vessel 82 and above the ring member 99 an annular space 102 between the extension 93 of the casing 90 and the pressure vessel 82 for the passage of coolant gas after the gas has traversed the heat exchanger assembly 92. The grid 89 supporting the moderator structure 87 is carried by angle brackets 103 welded inside the casing 90. The composite radiation shield 91 which comprises alternate layers of mild steel plates 104 and graphite blocks 105 has a central part 107 of circular cross-section suspended from a grid of beams 137 which are welded to the extension 93 of the casing 90 and rest on the flange 94. The part 107 of the shield 91 is surrounded by an outer part 108 of annular cross section supported in the casing 90 by brackets 106. Part annular curved passageways 109 defined between the parts 107 and 108 of the shield 91 provide for the passage of coolant gas in circuit between fuel element channels 110 in the moderator structure 87 and the heat exchanger assembly 92. An extension 111 of the shield 91 is located in the thermally insulating gas space 101 between the pressure vessel 82 and the casing 90 and comprises parts 112 shaped to provide a staggered annular passageway 113 preserving the continuity of the gas space 101.

The lower end 97 of the casing 90 is closed by a laminated structure 114 serving two functions. Firstly, the structure 114 acts as a radiation shield by virtue of being constructed from alternate layers of mild steel plates 115 and graphite blocks 116. Secondly, as the structure 114 is sealed inside the casing 90 it acts to withstand the pressure of coolant gas within the pressure vessel 82 and the casing 90.

The structure 114 is pierced by a lattice of Y-branched refuelling tubes 117 each branched into two pipes 118 connecting with fuel element channels 110 in the moderator structure 87.

Referring to Figs. 12, 13 and 14 the refuelling tubes 117 each contain a rotatable cylindrical plug 119 terminating in a conical face 140 at the point of branching of the corresponding refuelling tube 117. As shown in Fig. 14 each plug 119 comprises a tubular body 121 closed by end plates 122 and fitted with a channel member 123 forming a longitudinal passageway 124 through the refuelling tube 117. The passageways 124 are normally blocked by hollow push rods 125 having upper end faces 126 complementing the conical end faces 140 of the plugs 119. The plug 119 and the push rods 125 are partially filled with alternate layers of mild steel 127 and graphite 128 preserving the continuity of the structure 114 which is pierced by the refuelling tubes 117. A string of fuel elements 129 is supported in each of the fuel element channels 110 by spider ended struts 130 acting between the bottom fuel element 129 of each string and the conical end face 140 of the corresponding rotatable plug 119.

Coolant gas is circulated (as indicated in Fig. 11) by the arrows 131, in a closed circuit including the fuel element channels 110 and the heat exchanger assembly 92. The coolant gas is circulated by means of coolant circulating pumps 132 located in manifold pipes 133 connecting with the pressure vessel 82 above and below the ring member 99. The manifold pipes 133 also include shut off valves 134. Heated coolant passes from the fuel element channels 110 through the curved passageways 109 in the radiation shield 91 and thence through the heat exchanger assembly 92. From the heat exchanger assembly 92 the coolant passes down the annular space 102 above the ring member 99 and through the coolant circulating pumps 132 via the manifold pipes 133. The coolant gas is then passed into the casing 90 below the moderator structure 87 through ports 135 in the casing 90 and thence through ports 136 in the refuelling tubes 117 (see Fig. 12) into the fuel element channels 110 thus completing the circuit.

During normal operation of the reactor the rotatable plug 119 in each of the refuelling tubes 117 is located as shown in Fig. 13 with the passageway 124 blocked by the corresponding push rod 125.

To discharge a particular fuel element channel 110 the rotatable plug 119 of the refuelling tube 117 associated with that channel 110 is rotated so that the passageway 124 is positioned in connection with the branch arm 118 leading into the fuel element channel 110 required to be discharged. The push rod 125 is then removed to unblock the passageway 124 so that the string of fuel elements 129 can be discharged en block through the passageway 124 with the struts 130. The fuel element channel 110 is recharged by alternately inserting new fuel elements 129 into the passageway 124 while the rotatable plug 119 is positioned as shown in Fig. 13 and raising the fuel elements up into the fuel element channel 110 by means of the push rod 125 after rotating the plug 119 so that the passageway 124 connects with the fuel element channel 110 to be recharged through the corresponding branch arm 118 of the refuelling tube 117. While each fuel element is inserted in the passageway 124 the fuel elements already inserted are retained by the conical end face 140 of the rotatable plug 119. After charging of the full string of fuel elements the spider ended struts 130 are inserted in a similar manner to the fuel elements so that the recharged string of fuel elements is supported in the fuel element channel 110 as shown in Fig. 11.

The structure 114 which acts as a radiation shield to protect personnel working beneath the reactor also shields the seam weld between the casing 90 and the pressure vessel 82 so that this seam weld is accessible for breaking down when it is necessary to remove the casing 90 with the moderator structure 87 and the heat exchanger assembly 92 en bloc from the pressure vessel 82 in the event of a major structural failure during the working life of the reactor.

We claim:

1. In combination with a nuclear reactor of the kind comprising a core structure defining vertically orientated fuel element channels passing therethrough, a device for giving access to at least two of the fuel element channels comprising vertically orientated tube, branch tubes extending towards the core structure from that end of said vertically orientated tube which is nearest the core structure and each connecting with one of said fuel element channels, a member in and rotatable about the longitudinal axis of said vertically orientated tube defining a passageway lengthwise through the tube and terminating at a point off centre in the tube to couple with any one of said branch tubes depending on the angular position of the member in the tube and means defining apertures for coolant flow through the walls of said branch tubes.

2. The combination as claimed in claim 1 wherein the core structure of the nuclear reactor is of graphite blocks and said device has means for applying a compressive load on the core structure in a direction parallel to the fuel element channels.

3. The combination as claimed in claim 1 wherein the core structure of the nuclear reactor is of graphite blocks, the branch tubes are in contact with the core structure and are movable axially in relation to the vertically orientated tube and the member in and rotatable about the longitudinal axis of the vertically orientated tube thrusts on the branch tubes to provide a compressive load on the core structure in a direction parallel to the fuel element channels.

4. The combination as claimed in claim 1 wherein said member in and rotatable about the longitudinal axis of the vertically orientated tube is of basic tubular form and is at least partly filled with neutron absorbing material and said passageway is provided with a removable plug also containing neutron absorbing material.

5. The combination as claimed in claim 1 wherein the vertically orientated tube is located below the core structure, the branch tubes extend upwards from the upper end of said tube and each connect with one of the fuel element channels and fuel elements which are contained in the vertical fuel element channels are supported by members located in the branch tubes said members being supported on the rotatable member contained within the vertically orientated tube but removable along the passageway defined in the tube by said rotatable member.

References Cited in the file of this patent

UNITED STATES PATENTS

| | | |
|---|---|---|
| 2,756,858 | Kasschau | July 31, 1956 |
| 2,863,815 | Moore et al. | Dec. 9, 1958 |